United States Patent
Lei et al.

(10) Patent No.: US 12,155,487 B2
(45) Date of Patent: Nov. 26, 2024

(54) METHOD AND APPARATUS FOR REDUCING ONE-SHOT HYBRID AUTOMATIC REPEAT REQUEST-ACKNOWLEDGEMENT (HARQ-ACK) CODEBOOK SIZE

(71) Applicant: Lenovo (Beijing) Ltd., Beijing (CN)

(72) Inventors: Haipeng Lei, Haidian District (CN); Yu Zhang, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 86 days.

(21) Appl. No.: 17/770,888

(22) PCT Filed: Nov. 8, 2019

(86) PCT No.: PCT/CN2019/116691
§ 371 (c)(1),
(2) Date: Apr. 21, 2022

(87) PCT Pub. No.: WO2021/087976
PCT Pub. Date: May 14, 2021

(65) Prior Publication Data
US 2022/0385411 A1    Dec. 1, 2022

(51) Int. Cl.
*H04L 1/18* (2023.01)
*H04L 1/1607* (2023.01)
(Continued)

(52) U.S. Cl.
CPC .......... *H04L 1/1822* (2013.01); *H04L 1/1614* (2013.01); *H04L 1/1812* (2013.01); *H04L 5/0055* (2013.01)

(58) Field of Classification Search
CPC ................ H04L 1/1822; H04L 1/1614; H04L 1/1812; H04L 5/0055
See application file for complete search history.

(56) References Cited

U.S. PATENT DOCUMENTS

2017/0126365 A1*  5/2017  Peng .................... H04L 1/1822
2019/0098631 A1*  3/2019  Chung .............. H04W 72/1268
(Continued)

FOREIGN PATENT DOCUMENTS

CN         110121914 A       8/2019

OTHER PUBLICATIONS

"International Search Report and Written Opinion", PCT Application No. PCT/CN2019/116691, Jul. 24, 2020, 6 pages.
(Continued)

*Primary Examiner* — Samir W Rizk
(74) *Attorney, Agent, or Firm* — FIG. 1 Patents

(57) ABSTRACT

The subject disclosure relates to a method and apparatus for reducing a one-shot HARQ-ACK codebook size. One embodiment of the subject disclosure provides a method performed by a User Equipment (UE), including receiving, from a base station (BS), a first signaling configuring a first plurality of carriers, wherein HARQ-ACK feedback for the first plurality of carriers is transmitted in same PUCCH; receiving, from the BS, Downlink Control Information (DCI) requesting HARQ-ACK feedback for one or more carriers of the first plurality of carriers; and transmitting, to the BS, a HARQ-ACK codebook in the PUCCH, wherein the HARQ-ACK codebook comprises the HARQ-ACK feedback for the one or more carriers of the first plurality of carriers.

20 Claims, 13 Drawing Sheets

(51) Int. Cl.
*H04L 1/1812* (2023.01)
*H04L 1/1822* (2023.01)
*H04L 5/00* (2006.01)

(56) References Cited

U.S. PATENT DOCUMENTS

| | | | |
|---|---|---|---|
| 2019/0103943 A1 | 4/2019 | Wang et al. | |
| 2019/0132834 A1* | 5/2019 | Yan | H04L 5/0032 |
| 2020/0358587 A1* | 11/2020 | Wang | H04W 72/23 |
| 2022/0217756 A1* | 7/2022 | Wu | H04L 5/0055 |

OTHER PUBLICATIONS

Huawei, et al., "HARQ enhancements in NR unlicensed", 3GPP TSG RAN WG1 Meeting #96bis, R1-1905648, Xi'an, China, Apr. 2019, 13 pages.
PCT/CN2019/116691, "International Preliminary Report on Patentability", PCT Application No. PCT/CN2010/116691, May 19, 2022, 5 pages.
Qualcomm Incorporated, "Enhancements to Scheduling and HARQ operation for NR-U", 3GPP TSG RAN WG1 Meeting #97, R1-1907263, Reno, NV, US, May 2019, 12 pages.
201980101695, "Foreign Office Action", Jun. 26, 2023, 12 pages.
201980101695, "Notice of Decision to Grant", CN Application No. 201980101695, Oct. 30, 2023, 3 pages.

* cited by examiner

METHOD AND APPARATUS FOR REDUCING ONE-SHOT HYBRID AUTOMATIC REPEAT REQUEST-ACKNOWLEDGEMENT (HARQ-ACK) CODEBOOK SIZE

TECHNICAL FIELD

The subject disclosure relates to the $3^{rd}$ Generation Partnership Project (3GPP) 5G New Radio (NR), especially to a method and apparatus for reducing the size of a one-shot Hybrid Automatic Repeat reQuest Acknowledgement (HARQ-ACK) codebook.

BACKGROUND OF THE INVENTION

In order to report postponed HARQ-ACK feedback, a User Equipment (UE) would transmit one-shot HARQ-ACK feedback for all the configured downlink HARQ processes. However, one-shot HARQ-ACK feedback leads to a relatively large HARQ-ACK codebook. The typical number of Downlink (DL) HARQ processes is 16, so the one-shot HARQ-ACK codebook size is 16 when the maximum number of codewords which can be scheduled by single DCI is 1, or 32 when the maximum number of codewords which can be scheduled by single DCI 2. Considering the CBG (code block group)—based transmission and carrier aggregation, the one-shot HARQ-ACK codebook will be increased dramatically.

Therefore, it is desirable to reduce the size of the one-shot HARQ-ACK codebook.

SUMMARY

The subject disclosure provides several solutions to reduce the size of the one-shot HARQ-ACK codebook.

One embodiment of the subject disclosure provides a method performed by a User Equipment (UE), including receiving, from a base station (BS), a first signaling configuring a first plurality of carriers, wherein hybrid automatic repeat request-acknowledgement (HARQ-ACK) feedback for the first plurality of carriers is transmitted in same physical uplink control channel (PUCCH); receiving, from the BS, Downlink Control Information (DCI) requesting HARQ-ACK feedback for one or more carriers of the first plurality of carriers; and transmitting, to the BS, a HARQ-ACK codebook in the PUCCH, wherein the HARQ-ACK codebook comprises the HARQ-ACK feedback for the one or more carriers of the first plurality of carriers.

Another embodiment of the subject disclosure provides a method performed by a Base Station (BS), including transmitting, to a User Equipment (UE), a first signaling configuring a first plurality of carriers, wherein hybrid automatic repeat request-acknowledgement (HARQ-ACK) feedback for the first plurality of carriers is transmitted in same physical uplink control channel (PUCCH); transmitting, to the UE, Downlink Control Information (DCI) requesting HARQ-ACK feedback for one or more carriers of the first plurality of carriers; and receiving, from a UE, a HARQ-ACK codebook in the PUCCH, wherein the HARQ-ACK codebook comprises the HARQ-ACK feedback for the one or more carriers of the first plurality of carriers.

Yet another embodiment of the subject disclosure provides an apparatus including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a User Equipment (UE), including receiving, from a base station (BS), a first signaling configuring a first plurality of carriers, wherein HARQ-ACK feedback for the first plurality of carriers is transmitted in same PUCCH; receiving, from the BS, Downlink Control Information (DCI) requesting HARQ-ACK feedback for one or more carriers of the first plurality of carriers; and transmitting, to the BS, a HARQ-ACK codebook in the PUCCH, wherein the HARQ-ACK codebook comprises the HARQ-ACK feedback for the one or more carriers of the first plurality of carriers.

Still another embodiment of the subject disclosure provides an apparatus including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a Base Station (BS), including transmitting, to a User Equipment (UE), a first signaling configuring a first plurality of carriers, wherein HARQ-ACK feedback for the first plurality of carriers is transmitted in same PUCCH; transmitting, to the UE, Downlink Control Information (DCI) requesting HARQ-ACK feedback for one or more carriers of the first plurality of carriers; and receiving, from a UE, a HARQ-ACK codebook in the PUCCH, wherein the HARQ-ACK codebook comprises the HARQ-ACK feedback for the one or more carriers of the first plurality of carriers.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

The embodiments provide a method and apparatus for downlink (DL) or uplink (UL) data transmission on an unlicensed spectrum. To facilitate understanding, the embodiments are provided under specific network architecture and new service scenarios, such as 3GPP 5G, 3GPP LTE Release 8 and so on. Persons skilled in the art know very well that, with the future development of network architecture and new service scenarios, the embodiments in the present disclosure are also applicable to similar technical problems.

Figure 1:
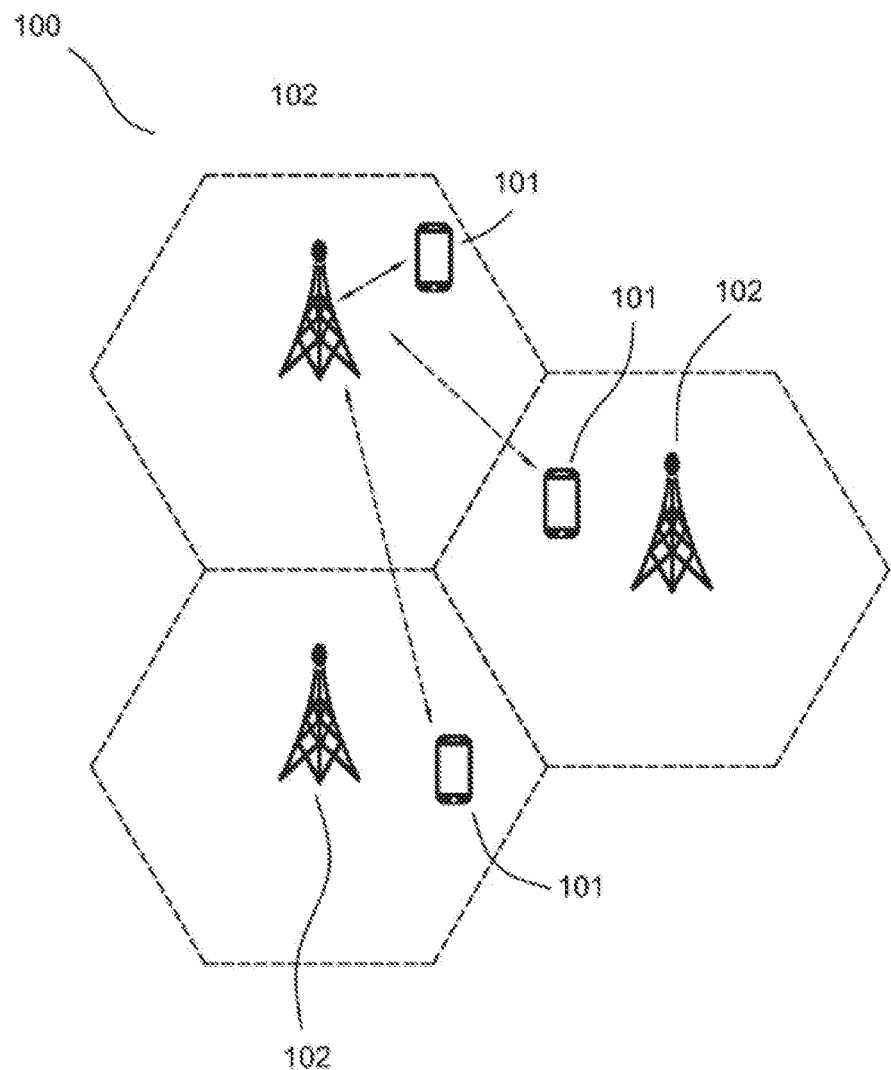
FIG. 1 illustrates a schematic diagram of a wireless communication system according to some embodiments of the subject disclosure.

FIG. 1 illustrates a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile phone, a mobile station, a user, a terminal, a mobile terminal, a wireless terminal, a fixed terminal, a subscriber station, a user terminal, or any device described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using 3GPP 5G protocols.

The DL TBs (transport blocks) are carried on the Physical Downlink Shared Channel (PDSCH). A maximum of two TBs can be transmitted on PDSCH in one serving cell and in one slot. HARQ-ACK in the subject disclosure represents collectively the Positive Acknowledgement (ACK) and the Negative Acknowledgement (NACK). ACK means a TB is correctly received while NACK means a TB is erroneously received. For the TB-based retransmission, one HARQ-ACK feedback bit corresponds to one TB. A HARQ-ACK information bit value of "0" represents a negative acknowledgement (NACK) while a HARQ-ACK information bit value of "1" represents a positive acknowledgement (ACK). The HARQ-ACK feedback bits corresponding to the PDSCH are transmitted either on a Physical Uplink Control Channel (PUCCH) or on a Physical Uplink Shared Channel (PUSCH).

In NR, besides TB-based retransmission, CBG-based retransmission is also supported. The intention of a CBG is to group several code blocks into one code block group and the resulting HARQ-ACK feedback is generated per the CBG. Only all the code blocks within one CBG are correctly decoded, the HARQ-ACK for the CBG can be set to "ACK"; otherwise, it is set to "NACK". Upon the reception of the HARQ-ACK feedback, only the CBG(s) with "NACK" shall be retransmitted by the transmitter. For CBG-based retransmission, Radio Resource Control (RRC)

signaling is used to configure the maximum number of CBGs per TB. The maximum number of CBGs per TB can be 2, 4, 6 and 8. For both the semi-static HARQ-ACK codebook and the dynamic HARQ-ACK codebook, the number of HARQ-ACK bits for one TB is equal to the configured maximum number of CBGs per TB, regardless of the variable TBs of a given TB.

For transmission on an unlicensed spectrum, in order to achieve fair coexistence with other wireless systems, a channel access procedure, i.e., Listen Before Talk (LBT) is required before the transmission on the unlicensed spectrum. By means of performing energy detection on a certain channel, if a received power signal is below a predefined threshold, then the LBT is successful, which means the channel is deemed as empty and available for transmission; if the received power signal is above the predefined threshold, then the LBT is failed, which means the channel is occupied by other nodes or other wireless systems and not available for transmission. Only when the LBT is successful, can a device start its transmission on the channel and occupy the channel up to a Maximum Channel Occupancy Time (MCOT); otherwise, the device cannot start transmission and continues to perform the LBT procedure until a successful LBT is achieved.

When HARQ-ACK feedback is to be transmitted on an unlicensed carrier, LBT is needed before the HARQ-ACK transmission. If and only if LBT is successful can a UE start HARQ-ACK transmission; otherwise, the UE has to give up the HARQ-ACK transmission. If the UE fails to transmit HARQ-ACK feedback due to LBT failure, then the corresponding PDSCHs have to be retransmitted since the gNB has no knowledge about the decoding results of the PDSCHs at the UE side.

HARQ-ACK feedback for multiple PDSCHs can be multiplexed in one HARQ-ACK codebook by means of HARQ-ACK multiplexing. There are two HARQ-ACK codebooks in NR Rel-15:

The first codebook is the Semi-static HARQ-ACK codebook (also called Type 1 in TS38.213 Rel-15). The size of the semi-static HARQ-ACK codebook is determined based on the following four parameters: i) the configured number of TBs of one PDSCH; ii) the configured number of candidate PDSCH occasions in a time domain; iii) the configured number of carriers; and iv) the configured maximum number of CBGs per TB. The semi-static HARQ-ACK codebook determination is more robust against missed and false DCI detections than the dynamic HARQ-ACK codebook determination. However, this robustness comes at the expense of more ACK feedback bits.

The second codebook is the Dynamic HARQ-ACK codebook (also called Type 2 in TS38.213 Rel-15). The size of the Dynamic HARQ-ACK codebook is determined based on the number of actually received DL transmissions to be acknowledged in the same slot. In order to solve the problem of missed and false DCI detections, counter DAI and total DAI fields are specified in the DCI which schedules the PDSCH.

For Rel-16 NR access on the unlicensed spectrum (NR-U), a non-numerical value is added to the possible range of PDSCH-to-HARQ-timing-indicator values defined in Rel-15, and is used to indicate to the UE that the HARQ-ACK feedback for the corresponding PDSCH is postponed until the timing and resource for the HARQ-ACK feedback is provided by the gNB. This postponed HARQ-ACK feedback is indicated by the gNB when the corresponding PDSCH is transmitted at the end of the gNB-initiated COT and the gNB is unable to predict a suitable slot for the UE to transmit the HARQ-ACK feedback.

To solve this problem, one-shot HARQ-ACK feedback is proposed. The main objective is to use one DCI to trigger the HARQ-ACK feedback for all the configured downlink HARQ processes. Upon receiving the triggering DCI, the UE shall transmit the HARQ-ACK information bits for all HARQ processes in one HARQ-ACK codebook. In this way, not only the postponed HARQ-ACK feedback for PDSCHs in the earlier COT or current COT can be triggered for transmission, but also the previous HARQ-ACK feedback which are not transmitted due to LBT failure at UE side or not correctly received at gNB side due to burst interference can be triggered for retransmission. Basically, this one-shot triggering mechanism can be deemed as a fallback solution for both semi-static and the dynamic HARQ-ACK codebook determination. This mechanism is more applicable to the semi-static HARQ-ACK codebook since the pending HARQ-ACK feedback can be triggered for transmission. As for the dynamic HARQ-ACK codebook, the one-shot feedback mechanism may bring marginal gain.

For one-shot HARQ-ACK feedback transmission, it is supported for requesting feedback of a HARQ-ACK codebook containing all DL HARQ processes, e.g., one-shot feedback, for all Component Carriers (CCs) configured for a UE in the PUCCH group. One-shot feedback should be configurable separately from the configuration of semi-static (including any potential enhancements) or non-enhanced dynamic HARQ codebook If a UE is configured to monitor feedback request of a HARQ-ACK codebook containing all DL HARQ processes, that is, one-shot feedback: the feedback can only be requested in a UE-specific DCI, and the feedback can be requested for reporting in PUCCH. The feedback can be piggybacked on PUSCH according to Rel-15 behaviour.

Figure 2:
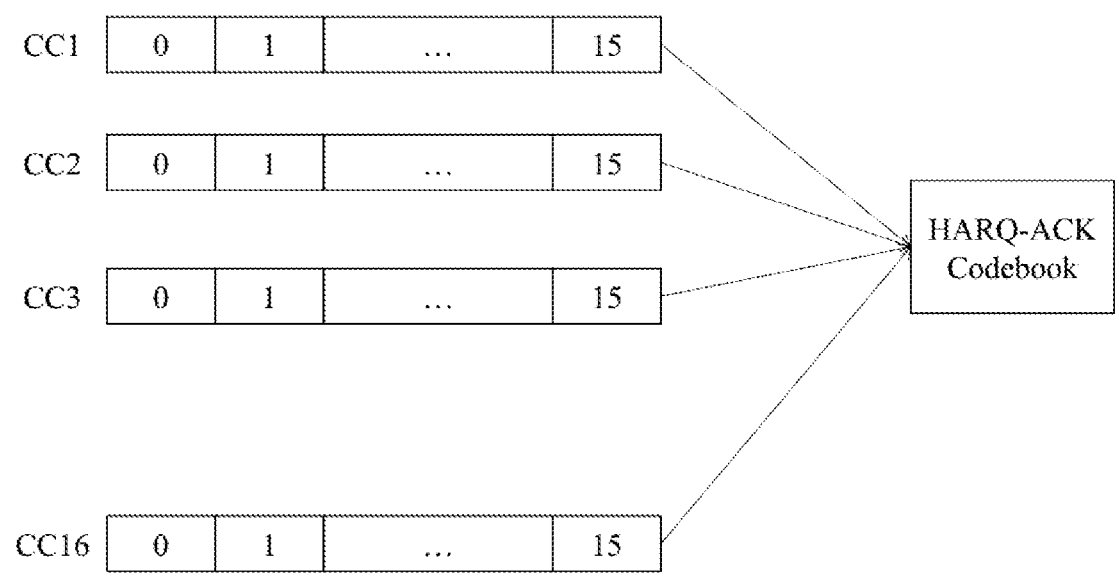
FIG. 2 illustrates an example of a HARQ-ACK codebook according to some embodiments of the subject disclosure.

However, one-shot HARQ-ACK feedback leads to a huge HARQ-ACK codebook. For example, assuming 16 component carriers in one PUCCH group are configured for the UE and the number of DL HARQ processes is 16, as shown in FIG. 2, 16 component carriers are CC1, CC2, CC16, and the 16 DL HARQ processes are 0, 1, . . . , 15. Without consideration of CBG-based retransmission, when the maximum number of codewords which can be scheduled by single DCI is 1, the size of the one-shot HARQ-ACK codebook size is 16×16=256, and when the maximum number of codewords which can be scheduled by single DCI is 2, the size of the one-shot HARQ-ACK codebook size is 16×16×2=512.

Taking the CBG-based transmission into consideration, assuming the maximum number of CBGs per TB is configured to 8, then the one-shot HARQ-ACK codebook size is equal to 256×8=2048. This huge codebook leads to a large amount of resource for transmitting the PUCCH. Moreover, the transmission reliability is dramatically reduced and excessive UL transmission power is required. For a HARQ process where the scheduled PDSCH is missed by UE or no associated PDSCH is scheduled, "NACK" is generated in the HARQ-ACK codebook corresponding to the HARQ process.

Furthermore, a large amount of unnecessary signaling overhead is included in the HARQ-ACK codebook for one-shot HARQ-ACK feedback. As shown in FIG. 2, even if only one CC is used to carry PDSCH for the UE, when the maximum number of codewords which can be scheduled by single DCI is 1, UE has to report at least 256 HARQ-ACK information bits for all 16 DL HARQ processes for all the 16 configured CCs, and when the maximum number of codewords which can be scheduled by single DCI is 2, UE has to report 512 512 HARQ-ACK information bits. Additionally, for a carrier, if only one HARQ process is used to transmit PDSCH, it is not necessary to transmit at least 16 or 32 HARQ-ACK information bits for all 16 DL HARQ processes for the CC when the maximum number of codewords which can be scheduled by single DCI is 1 or 2, respectively. Accordingly, it is obvious that too much unnecessary overhead is included in the HARQ-ACK codebook.

In this subject disclosure, several solutions for codebook reduction for one-shot HARQ-ACK feedback are proposed for NR access on NR-U.

Figure 3:
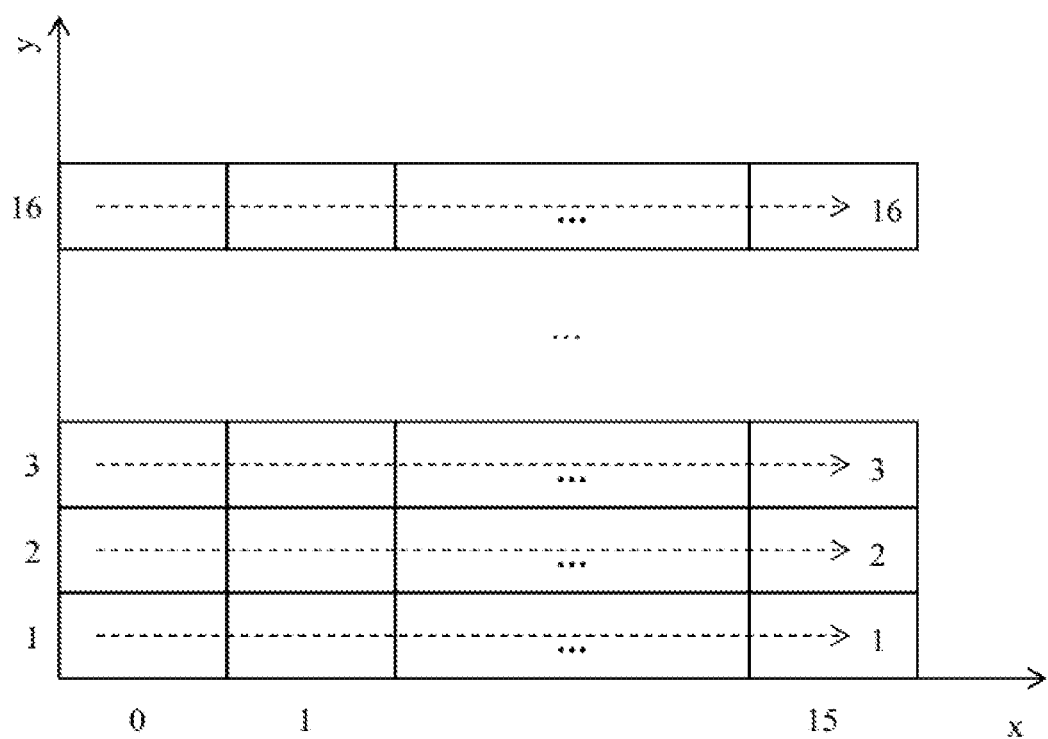
FIG. 3 illustrates a method for ordering the bits in the HARQ-ACK codebook according to some embodiments of the subject disclosure.

FIG. 3 illustrates an arrangement of the bits of the HARQ-ACK codebook according to some embodiments of the subject application. In FIG. 3, the x axis represents the DL HARQ processes, and the y axis represents the serving cell indexes configured for the carriers. There are 16 DL HARQ processes, and their IDs are 0, 1, . . . , 15, respectively; there are 16 component carriers, and the serving cell indexes configured for the component carriers are 1, 2, 3, . . . , 16, respectively. Alternatively, the serving cell indexes configured for the component carriers can be 0, 1, 2, 3, . . . , 15, respectively. Suppose the HARQ-ACK information bits in the HARQ-ACK codebook are denoted with $b_{x,y}$, wherein x is the HARQ process ID, and y is the serving cell index of the carrier. The bits are arranged as follows: $b_{0,1}, b_{1,1}, \ldots, b_{15,1}; b_{0,2}, b_{1,2}, \ldots, b_{15,2}; b_{0,3}, b_{1,3}, \ldots, b_{15,3}; \ldots, b_{0,16}, b_{1,16}, \ldots, b_{15,16}$. The arrows with the number 1, 2, 3, . . . , 16 also indicate the sequence of these bits.

In other words, the bits are ordered in time-first frequency-second manner, first in ascending order of the HARQ process ID (i.e. the x axis) for a carrier configured with lowest serving cell index in the PUCCH group, then in ascending order of serving cell index of the carrier (i.e. the y axis). In detail, the HARQ-ACK information bits for all DL HARQ process on the carrier with lowest serving cell index, which is 1, are placed firstly in the HARQ-ACK codebook in the ascending order of HARQ process IDs, which are 0, 1, . . . , 15. That is, the first 16 bits in the codebook is: $b_{0,1}, b_{1,1}, \ldots, b_{15,1}$. Then the HARQ-ACK information bits for all DL HARQ processes on the carrier with second lowest serving cell index, which is 2, are placed immediately following the HARQ-ACK information bits for the carrier with lowest serving cell, which is 1. The ordering of the HARQ-ACK information bits for the carrier with second lowest serving cell index is still in the ascending order of HARQ process IDs. Therefore, the second 16 bits in the codebook is: $b_{0,2}, b_{1,2}, \ldots, b_{15,2}$. Then the HARQ-ACK information bits for the carrier with third lowest serving cell index are placed immediately following HARQ-ACK information bits for the carrier with second lowest serving cell index. Such operation is repeated until the carrier with the largest serving cell index in the same PUCCH group. Alternatively, for one carrier, the HARQ-ACK information bits for all DL HARQ process are placed in the descending order of HARQ process IDs. That is, the bits in FIG. 3 may be ordered as follows: $b_{15,1}, \ldots b_{1,1}, b_{0,1}; b_{15,2}, \ldots b_{1,2}, b_{0,2}; \ldots; b_{15,16}, \ldots b_{1,16}, b_{0,16}$.

Figure 4:
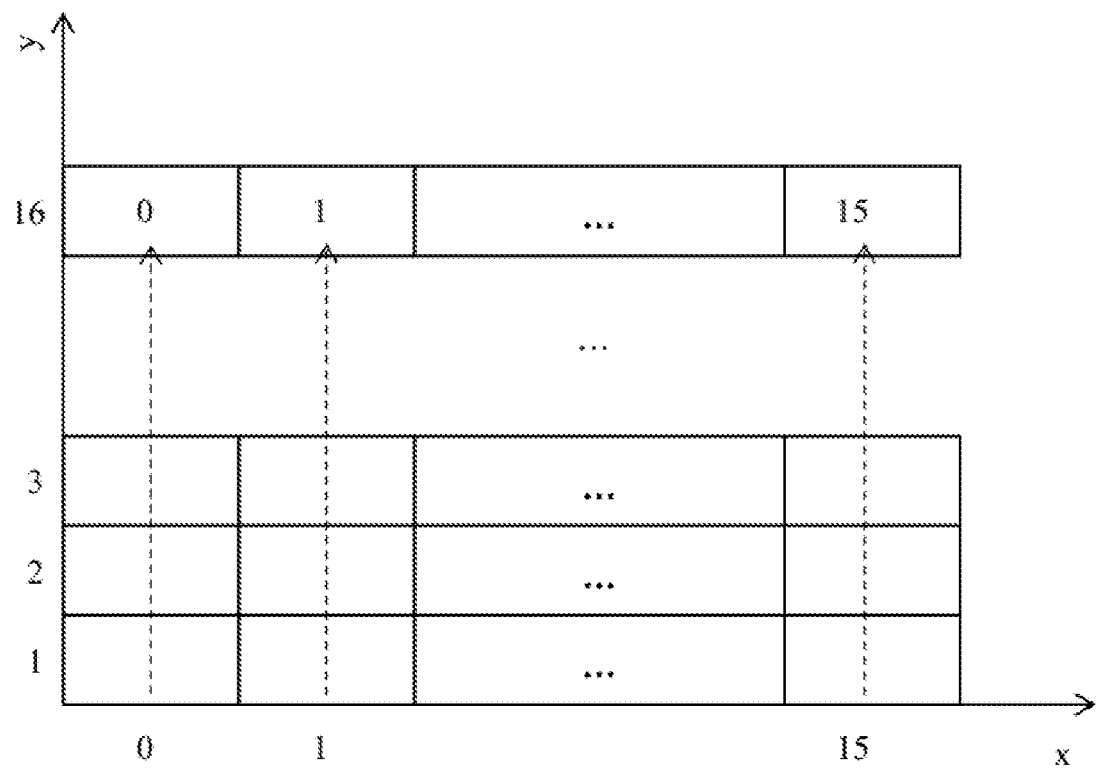
FIG. 4 illustrates another method for ordering the bits in the HARQ-ACK codebook according to some embodiments of the subject disclosure.

FIG. 4 illustrates another arrangement of the bits of the HARQ-ACK codebook according to some embodiments of the subject application. The bits in FIG. 4 are denoted the same fashion as in FIG. 3, namely, there are 16 HARQ processes, and their IDs are 0, 1, . . . , 15, respectively; there are 16 component carriers, and the serving cell indexes configured for these carriers are 1, 2, 3, . . . , 16, respectively. Alternatively, the serving cell indexes configured for the component carriers can be 0, 1, 2, 3, . . . , 15, respectively. Suppose these bits are denoted with: $b_{x,y}$, wherein x is the HARQ process ID, and y is the serving cell index configured for the carriers. The bits are arranged as follows: $b_{0,1}, b_{0,2}, b_{0,3}, \ldots, b_{0,16}; b_{1,1}, b_{1,2}, b_{1,3}, \ldots, b_{1,16}; \ldots; b_{15,1}, b_{15,2}, b_{15,3}, \ldots, b_{15,16}$. The arrows with the number 0, 1, . . . , 15 also indicate the sequence of these bits.

In FIG. 4, the HARQ-ACK information bits in the codebook are ordered in frequency-first time-second manner. The ordering of HARQ-ACK information bits is first in ascending order of serving cell index of the carrier in the PUCCH group (i.e., the y axis), then in ascending order of HARQ process ID (i.e., the x axis). In detail, the HARQ-ACK information bits for the first HARQ process (e.g., HARQ process 0) for all the configured carriers in the same PUCCH group are placed firstly in the HARQ-ACK codebook in the ascending order of serving cell index. That is, the first 16 bits in the codebook is: $b_{0,1}, b_{0,2}, b_{0,3}, \ldots, b_{0,16}$. Then the HARQ-ACK information bits for the second HARQ process (e.g., HARQ process 1) for all the configured carriers in same PUCCH group are placed immediately following the HARQ-ACK information bits for the first HARQ process for all the configured carriers in same PUCCH group. Accordingly, the second 16 bits in the codebook is: $b_{1,1}, b_{1,2}, b_{1,3}, \ldots, b_{1,16}$. Then the HARQ-ACK information bits for the third HARQ process (e.g., HARQ process 2) for all the configured carriers in the same PUCCH group are placed immediately following HARQ-ACK information bits for the second HARQ process for all the configured carriers in same PUCCH group. Thus, the third 16 bits in the codebook is: $b_{2,1}, b_{2,2}, b_{2,3}, \ldots, b_{2,16}$. Such operation is repeated until the last HARQ process (e.g., HARQ process 15), and the final 16 bits in the codebook is: $b_{15,1}, b_{15,2}, b_{15,3}, \ldots, b_{15,16}$. Alternatively, for one HARQ process, the HARQ-ACK information bits for all the configured carriers in same PUCCH group are placed in the descending order of serving cell index. If so, the bits in FIG. 4 may be ordered as follows: $b_{0,16}, \ldots, b_{0,3}, b_{0,2}, b_{0,1}; b_{1,16}, \ldots, b_{1,3}, b_{1,2}, b_{1,1}; \ldots; b_{15,16}, \ldots, b_{15,3}, b_{15,2}, b_{15,1}$.

If different numbers of DL HARQ processes are configured for different carriers, the ordering manner of the bits in FIG. 3 is more suitable for one-shot HARQ-ACK feedback.

If overhead reduction in carrier domain is used for one-shot HARQ-ACK feedback, only the carriers requested in the triggering DCI for transmitting HARQ-ACK feedback for all DL HARQ processes are included in the available carriers in FIG. 3.

If overhead reduction in time domain is used for one-shot HARQ-ACK feedback, only the HARQ processes requested in the triggering DCI for transmitting HARQ-ACK feedback for all configured carriers in same PUCCH group are included in the available HARQ processes in FIG. 4.

If overhead reduction in both carrier domain and time domain are used for one-shot HARQ-ACK feedback, only the HARQ-ACK information bits for the requested HARQ processes for requested carriers in the triggering DCI are included in the HARQ-ACK codebook.

Regarding the HARQ-ACK codebook reduction in carrier domain for one-shot HARQ-ACK feedback, several solutions are proposed in the subject disclosure.

Figure 5:
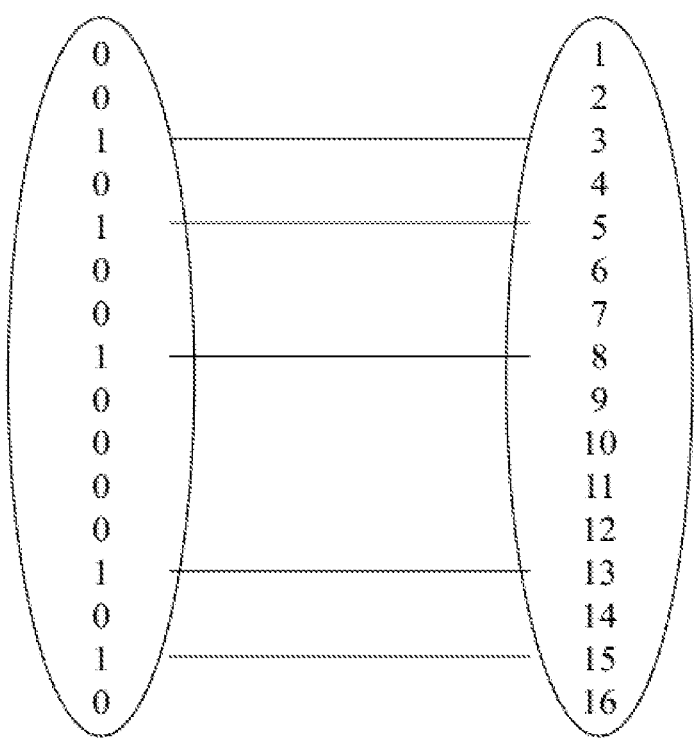
FIG. 5 illustrates a correspondence between a bitmap and the carriers in the same PUCCH group according to some embodiments of the subject disclosure.

In one embodiment, the DCI which triggers the one-shot HARQ-ACK feedback includes a bitmap for indicating the one or more carriers on which the UE is requested to transmit HARQ-ACK feedback for all DL HARQ processes. FIG. 5 illustrates the correspondence between a bitmap and 16 component carriers according to some embodiments of the subject application. In FIG. 5, there are 16 bits in the bitmap, which are depicted in the left oval in FIG. 5, and 16 configured carriers in the same PUCCH group, which are numbered as 1, 2, . . . 16 in the right oval in FIG. 5, each bit in the bitmap corresponding to one configured carrier. If the gNB transmits PDSCH(s) on a carrier, then the gNB shall request HARQ-ACK feedback for the carrier. The gNB could set the bit in the bitmap which corresponds to the carrier to a predetermined status, for example, the bit is set to "1", to request the HARQ-ACK feedback for the carrier. If the bit is not set to the predetermined status, for example, the bit is set to "0", then it means that the gNB does not request the HARQ-ACK feedback for the carrier corresponding to the bit. In FIG. 5, the $3^{rd}$, $5^{th}$, $8^{th}$, $13^{th}$, and $15^{th}$ bits in the bitmap are set to "1", and the rest bits in the bitmap are set to "0". According to the above description, the HARQ-ACK feedback for the $3^{rd}$, $5^{th}$, $8^{th}$, $13^{th}$, and $15^{th}$ carriers are requested by the gNB.

The predetermined status may be set to "0", that is, if the bit in the bitmap is set to "0", it means that the gNB requests the HARQ-ACK feedback for the carrier corresponding to the bit. Therefore, in FIG. 5, the HARQ-ACK feedback for the carriers except the $3^{rd}$, $5^{th}$, $8^{th}$, $13^{th}$, and $15^{th}$ carriers are requested by the gNB.

Upon reception of the triggering DCI, the UE shall generate the HARQ-ACK codebook including HARQ-ACK information bits for all the carriers indicated by the predetermined status, "1", in the bitmap, without the HARQ-ACK information bits for those carriers not indicated by the predetermined status in the bitmap. Therefore, the size of the HARQ-ACK codebook is reduced, and the signaling overhead for one-shot HARQ-ACK feedback can be greatly reduced.

The presence of the bitmap in the triggering DCI is configured by RRC signaling. In one embodiment, a dedicated bitmap is included in the triggering DCI if the presence is configured. Alternatively, the bitmap may reuse the present fields in the DCI, for example, the fields such as frequency domain resource allocation, Modulation and Coding Scheme (MCS) or other fields in the DCI.

In another embodiment, carrier grouping is used to group the carriers in the same PUCCH group with contiguous serving cell indexes into one carrier group, then a bitmap is included in the DCI triggering one-shot HARQ-ACK feedback. The number of carrier groups or the number of carriers within one carrier group is configured by RRC signaling. If 16 carriers are configured in the same PUCCH group and the number of carrier groups is configured to 4, then from the carrier with lowest serving cell index, e.g., serving cell index 0 (i.e., Primary Cell), every four contiguous carriers in the same PUCCH group are grouped.

Figure 6:
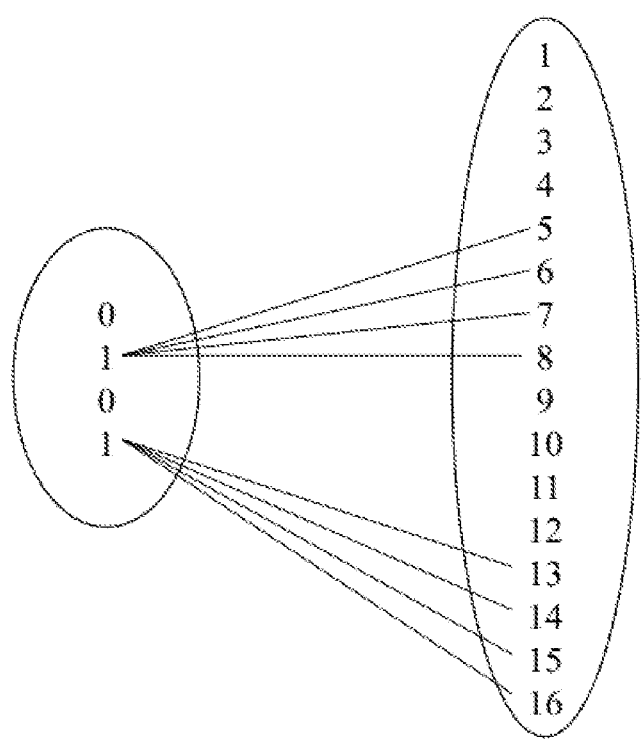
FIG. 6 illustrates another correspondence between a bitmap and the carriers in the same PUCCH group according to some embodiments of the subject disclosure.

FIG. 6 illustrates the correspondence between a bitmap and 16 carriers which are grouped according to some embodiments of the subject application. In FIG. 6, there are 16 configured carriers in the same PUCCH group, which are divided into 4 groups, which respectively includes the $1^{st}$, $2^{nd}$, $3^{rd}$, $4^{th}$ carriers, $5^{th}$, $6^{th}$, $7^{th}$, $8^{th}$ carriers, $9^{th}$, $10^{th}$, $11^{th}$, $12^{th}$ carriers, and $13^{th}$, $14^{th}$, $15^{th}$, $16^{th}$ carriers. There are 4 bits in the bitmap, with each bit in the bitmap corresponding to one group of the 4 groups. The bitmap is used to indicate the carrier groups where UE is requested to transmit HARQ-ACK feedback for all DL HARQ processes. The length of the bitmap, 4, is equal to the number of carrier groups in the same PUCCH group. The 16 configured carriers may be divided into other numbers of groups, for example: 8 groups or 2 groups, etc.

If the gNB transmits PDSCH(s) on at least one carrier of a carrier group, then the gNB shall request HARQ-ACK feedback for the carrier group which includes the carrier, by setting the corresponding bit in the bitmap to a predetermined state. The predetermined state may be the value "1" or "0". For example, in FIG. 6, if the gNB transmits PDSCH on the $5^{th}$ and $14^{th}$ carriers, then the gNB needs to request the HARQ-ACK feedback for the $5^{th}$ and $14^{th}$ carriers, the gNB then set the values of the $2^{nd}$ bit and the $4^{th}$ bit in the bitmap which corresponds to the carrier groups including the $5^{th}$ $6^{th}$, $7^{th}$, $8^{th}$ carriers, and $13^{th}$, $14^{th}$, $15^{th}$, $16^{th}$ carriers to "1". After receiving the DCI with the bitmap, the UE shall generate the HARQ-ACK codebook including HARQ-ACK information bits for the $5^{th}$, $6^{th}$, $7^{th}$, $8^{th}$, $13^{th}$, $14^{th}$, $15^{th}$, and $16^{th}$ carriers, but does not including HARQ-ACK information bits for the rest of the carriers.

Therefore, the size of the HARQ-ACK codebook is greatly reduced, and the signaling overhead for one-shot HARQ-ACK feedback can be greatly reduced.

In another embodiment, the carrier(s) where HARQ-ACK feedback for all the DL HARQ processes is requested is indicated by an indicator in the DCI. The indicator indicates the index of the first carrier of the carrier(s) and the number of the carrier(s) with contiguous indexes. For example, if the PUCCH group includes 16 carriers, and the DL HARQ processes on the $7^{th}$ to the $9^{th}$ carriers are requested, the indicator may indicate the index of the first carrier is 7, and the total number of the carriers is 3.

The indicator in the DCI may be a dedicated field or the existing fields in the DCI which are reinterpreted, for example, the existing fields may be frequency domain resource allocation, MCS or other fields.

In this embodiment, Resource indication value (RIV) based solution is used: e.g., if there are n configured carriers in one PUCCH group, then $$\left\lceil \log_2 \frac{n(n-1)}{2} \right\rceil \text{ bits}$$

are required to indicate all the possible combinations of the starting serving cell index and the total number of contiguous serving cell indexes in the same PUCCH group.

In another embodiment, when both one-shot HARQ-ACK feedback and dynamic HARQ-ACK codebook determination are simultaneously configured to UE, since counter Downlink Assignment Index (C-DAI) and total DAI (T-DAI) are accumulated in frequency-first and time-second manner, the UE can determine whether a carrier is used for transmitting PDSCH or not based on the C-DAI and T-DAI.

Figure 7:
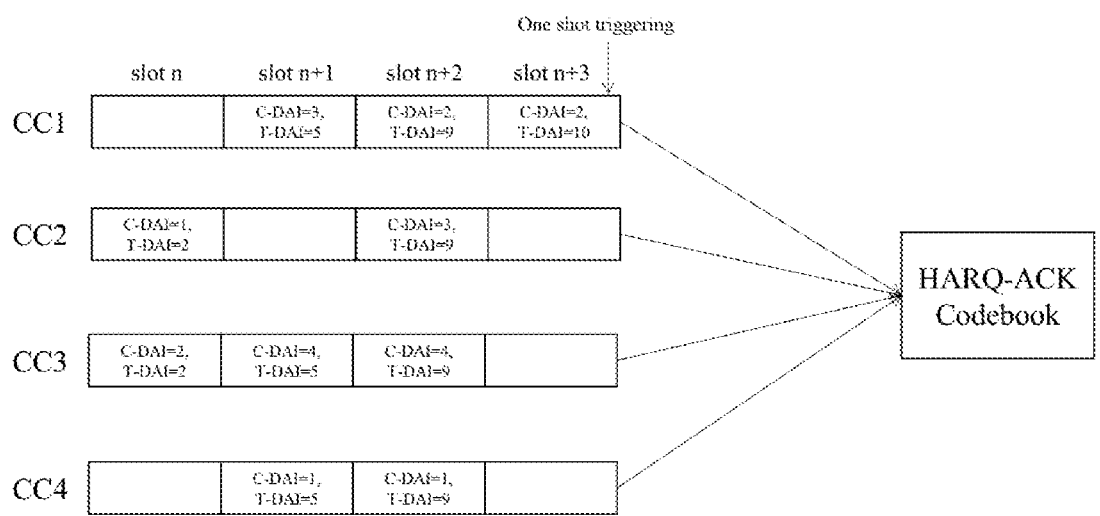
FIG. 7 illustrates a method for reducing the size of the HARQ-ACK codebook according to some embodiments of the subject disclosure.

In FIG. 7, there are four component carriers (CC), CC1, CC2, CC3, and CC4, and four slots, slot n, slot n+1, slot n+2, and slot n+3 on the four component carriers. The gNB sends the DCI for triggering the one-shot feedback in slot n+3 on CC1. In FIG. 7, each one of the four component carriers is used to transmit PDSCHs, based on C-DAI and T-DAI, the UE determines all the configured carriers, i.e., CC1 to CC4, are used to transmit PDSCHs based on both counter DAI and total DAI. Therefore, HARQ-ACK information bits for all DL HARQ processes on the four carriers are included in the one-shot HARQ-ACK codebook.

Figure 8:
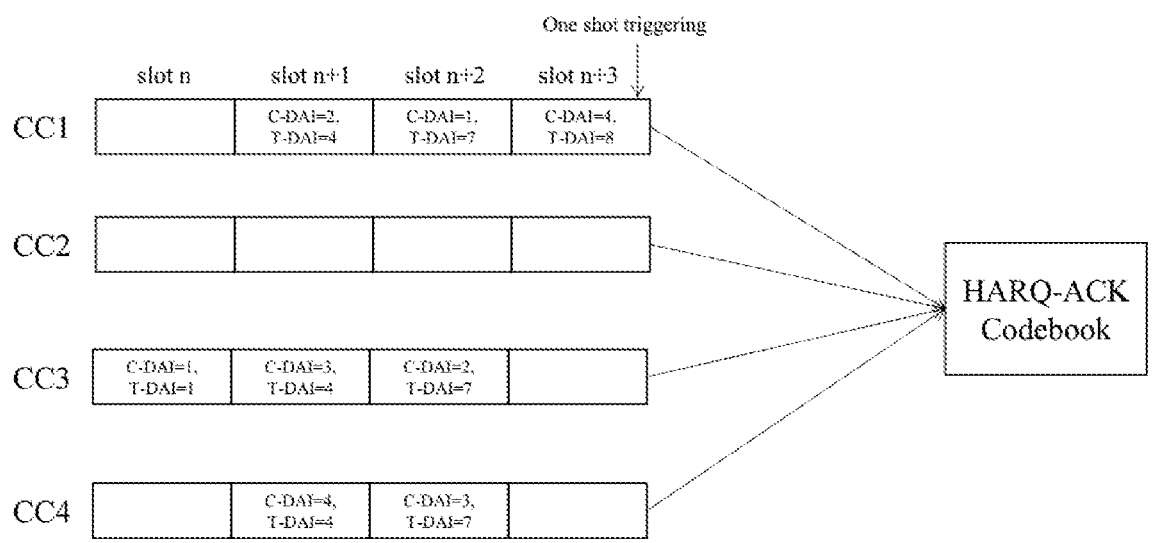
FIG. 8 illustrates a method for reducing the size of the HARQ-ACK codebook according to some embodiments of the subject disclosure.

In FIG. 8, three component carriers, CC1, CC3, and CC4 are used to transmit PDSCHs. Based on the C-DAI and T-DAI, the UE can determine that CC1, CC3, and CC4 are used to transmit PDSCHs, while CC2 is not. Therefore, the HARQ-ACK information bits for all DL HARQ processes on CC1, CC3, and CC4 are included in the one-shot HARQ-ACK codebook, while CC 2 is excluded from the same. The determination is based on the DL monitoring occasions between last HARQ-ACK feedback transmission and the time instant when the triggering DCI is received. Therefore, the size of the HARQ-ACK codebook is greatly reduced, and the signaling overhead for one-shot HARQ-ACK feedback can be greatly reduced.

In another embodiment, the size of the HARQ-ACK codebook is indicated in the one-shot triggering DCI. To save signaling overhead indicating the HARQ-ACK codebook size, some quantization values are predefined in standard or configured by RRC signaling. E.g., the quantization values can include 4, 8, 16, 24, 32, 40, 48, 64, 80, 96, 112, 128, 160, 192, 224, 256, etc. In case the number of actual HARQ-ACK information bits is smaller than the size of the indicated HARQ-ACK codebook, padding bits, e.g., NACK bits, are appended to ensure the same size to the indicated size.

Regarding the HARQ-ACK codebook reduction in time domain for one-shot HARQ-ACK feedback, several solutions are proposed in the subject disclosure below.

Figure 9:
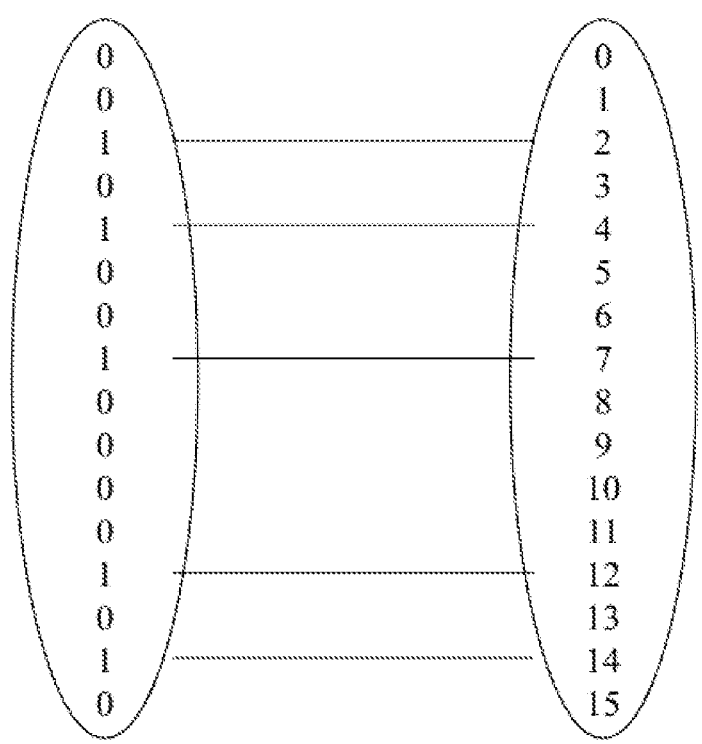
FIG. 9 illustrates a correspondence between a bitmap and the DL HARQ processes according to some embodiments of the subject disclosure.

In one embodiment, the DCI which triggers the one-shot HARQ-ACK feedback includes a bitmap for indicating the DL HARQ processes where the UE is requested to transmit HARQ-ACK feedback for the DL HARQ processes. The length of the bitmap is equal to a maximum number of the DL HARQ processes for the configured carriers. FIG. 9 illustrates the correspondence between such a bitmap and 16 DL HARQ processes according to some embodiments of the subject application. In FIG. 9, there are 16 bits in the bitmap, and the values of the 16 bits are depicted in the left oval, and there are 16 DL HARQ processes, which are numbered as 0, 1, 2, . . . , 15 in the right oval, each bit in the bitmap corresponding to one DL HARQ process. If the gNB transmits PDSCH(s) using one HARQ process ID, then the gNB shall request HARQ-ACK feedback for the HARQ process. The gNB could set the bit in the bitmap corresponding to the HARQ process to a predetermined status, for example, the bit is set to "1", to request the HARQ-ACK feedback for the HARQ process. If the bit is not set to the predetermined status, for example, the bit is set to "0", then it means that the gNB does not request the HARQ-ACK feedback for the corresponding HARQ process. In FIG. 9, the $3^{rd}$, $5^{th}$, $8^{th}$, $13^{th}$, and $15^{th}$ bits in the bitmap are set to "1", and the rest bits in the bitmap are set to "0". According to the above description, the HARQ-ACK feedback for the HARQ processes 2, 4, 7, 12, and 14 are requested by the gNB.

The predetermined status may be set to "0", that is, if the bit in the bitmap is set to "0", it means that the gNB requests the HARQ-ACK feedback for the corresponding HARQ process. Therefore, in FIG. 9, the HARQ-ACK feedback for the HARQ processes except the HARQ processes 2, 4, 7, 12, and 14 are requested by the gNB.

Upon reception of the triggering DCI, the UE shall generate the HARQ-ACK codebook including HARQ-ACK information bits for all the DL HARQ processes indicated by the predetermined status, "1", in the bitmap, without the HARQ-ACK information bits for those DL HARQ processes not indicated by the predetermined status, in the bitmap. Therefore, the size of the HARQ-ACK codebook is reduced, and the signaling overhead for one-shot HARQ-ACK feedback can be greatly reduced.

The presence of the bitmap in the triggering DCI is configured by RRC signaling. In one embodiment, a dedicated bitmap is included in the triggering DCI if the presence is configured. Alternatively, the bitmap may reuse the existing fields in the DCI, for example, reinterpreting frequency domain resource allocation, MCS or other fields as the bitmap.

In another embodiment, HARQ process grouping is utilized to group multiple contiguous HARQ processes into one or more HARQ process groups then a bitmap is included in the DCI triggering one-shot HARQ-ACK feedback.

Figure 10:
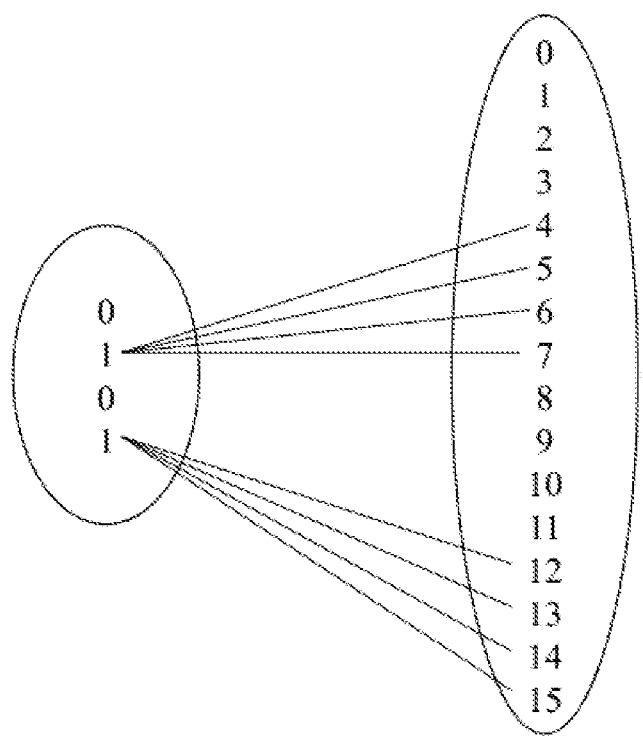
FIG. 10 illustrates another correspondence between a bitmap and the DL HARQ processes according to some embodiments of the subject disclosure.

The number of HARQ process groups and/or the number of HARQ process within one carrier HARQ process is configured by RRC signaling. If 16 DL HARQ processes are configured and the number of HARQ process groups is configured to 4, then from the first HARQ process, for example, HARQ process 0 in FIG. 10, every four contiguous HARQ processes are grouped. That is, the 16 DL HARQ processes 0, 1, 2, . . . , 15 in FIG. 10 are divided into four groups, which respectively includes the HARQ processes 0, 1, 2, 3, the HARQ processes 4, 5, 6, 7, the HARQ processes 8, 9, 10, 11, and the HARQ processes 12, 13, 14, and 15. The 16 DL HARQ processes may be divided into other number of groups, for example, 2 groups or 8 groups.

There are 4 bits in the bitmap, and each bit in the bitmap corresponds to one group of the 4 groups. The bitmap is used to indicate the HARQ process groups where UE is requested to transmit HARQ-ACK feedback for all the indicated DL HARQ processes. The length of the bitmap, 4, is equal to the number of HARQ process groups.

If the gNB transmits PDSCH(s) on at least one HARQ process of a HARQ process group, then gNB shall request HARQ-ACK feedback for the HARQ process group by setting the corresponding bit in the bitmap to a predetermined state. The predetermined state may be the value "1" or "0". For example, in FIG. 10, if the gNB transmits PDSCH on the HARQ processes 4 and 13, then the gNB needs to request the HARQ-ACK feedback for the HARQ processes 4 and 13, the gNB then set the values of the $2^{nd}$ bit and the $4^{th}$ bit in the bitmap which respectively corresponds to the HARQ process groups including the HARQ processes 4, 5, 6, 7, and the HARQ process groups including the HARQ processes 12, 13, 14, and 15 to "1". After receiving the DCI with the bitmap, the UE shall generate the HARQ-ACK codebook including HARQ-ACK information bits for the HARQ processes 4, 5, 6, 7, 12, 13, 14, and 15, but does not including HARQ-ACK information bits for the rest of the HARQ processes. Therefore, the size of the HARQ-ACK codebook is greatly reduced, and the signaling overhead for one-shot HARQ-ACK feedback can be greatly reduced.

In another embodiment, the HARQ processes where HARQ-ACK feedback is requested is indicated in the triggering DCI by indicating the starting HARQ process ID and number of contiguous HARQ processes. For example, if there are 16 HARQ processes, which are numbered as 0, 1, . . . , 15, and the HARQ-ACK feedback on the $7^{th}$ to the $9^{th}$ HARQ processes are requested, the indicator may indicate the index of the first HARQ process is 6, and the total number of the HARQ processes is 3.

The indicator in the DCI may be a dedicated field or the existing fields in the DCI which are reinterpreted, for example, the existing fields such as frequency domain resource allocation, MCS or other fields.

In this embodiment, Resource indication value (RIV) based solution is used: e.g., if there are n configured HARQ processes, then $$\left\lceil \log_2 \frac{n(n-1)}{2} \right\rceil \text{ bits}$$

are required to indicate all the possible combinations of the starting HARQ process ID and the total number of contiguous HARQ processes.

If overhead reduction in both carrier domain and time domain are used for one-shot HARQ-ACK feedback, only the HARQ-ACK information bits for the requested HARQ processes for requested carriers in the triggering DCI are included in the HARQ-ACK codebook. Under this circumstance, the DCI should include both one indicator for indicating the carriers and another indicator for indicating the DL HARQ processes, to request the HARQ-ACK information bits for the requested HARQ processes for requested carriers.

Regarding the fallback HARQ-ACK codebook determination for one-shot HARQ-ACK feedback, when a UE is requested by gNB for transmitting HARQ-ACK feedback for all the DL HARQ processes for all the configured carriers in same PUCCH group, if the UE only receives:
- a SPS PDSCH release indicated by DCI format 1_0 with counter DAI field value of 1 on the Primary Cell (PCell), or
- a PDSCH reception scheduled by DCI format 1_0 with counter DAI field value of 1 on the PCell, or
- SPS PDSCH reception Then the UE determines the one-shot HARQ-ACK codebook only including HARQ-ACK information bit for the SPS PDSCH release or only for the PDSCH reception or only for the SPS PDSCH reception; otherwise, the HARQ-ACK codebook includes HARQ-ACK feedback for all the DL HARQ processes for all the configured carriers in the same PUCCH group.

Figure 11:
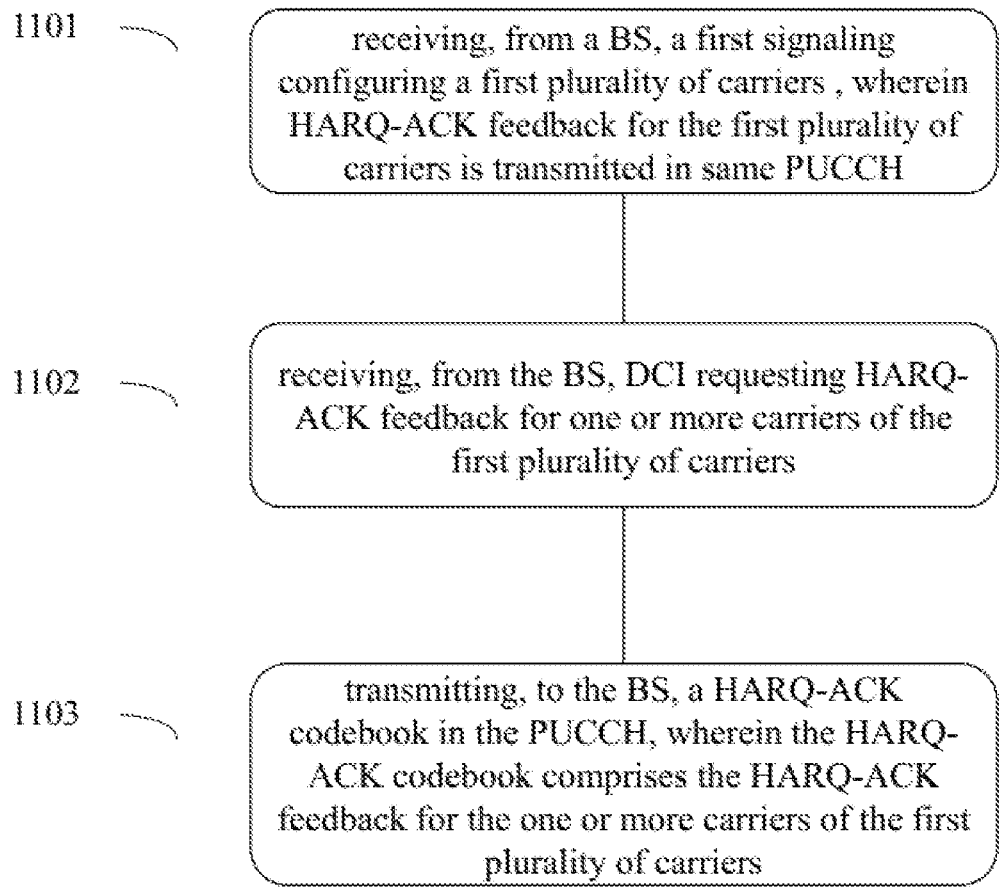
FIG. 11 illustrates a method performed by a UE for wireless communication according to some embodiments of the subject disclosure.

FIG. 11 illustrates a method performed by a UE for wireless communication according to some embodiments of the subject disclosure. In step 1101, the UE (e.g., UE 101 as shown in FIG. 1) receives, from a BS (e.g., BS 102 as shown in FIG. 1), a first signaling configuring a plurality of carriers, for example, the configured carriers 1-16 in FIG. 5. The HARQ-ACK feedback for the plurality of carriers is transmitted in same PUCCH. In step 1102, the UE also receives, DCI requesting HARQ-ACK feedback for one or more carriers of the plurality of carriers, for example, in FIG. 5, the DCI requests the HARQ-ACK feedback for the component carriers 3, 5, 8, 13, and 15. In step 1103, the UE transmits a HARQ-ACK codebook in the PUCCH, wherein the HARQ-ACK codebook comprises the HARQ-ACK feedback for the one or more carriers of the first plurality of carriers. Such a HARQ-ACK codebook in FIG. 5 includes the HARQ-ACK feedback for the carriers 3, 5, 8, 13, and 15 in the PUCCH.

Figure 12:
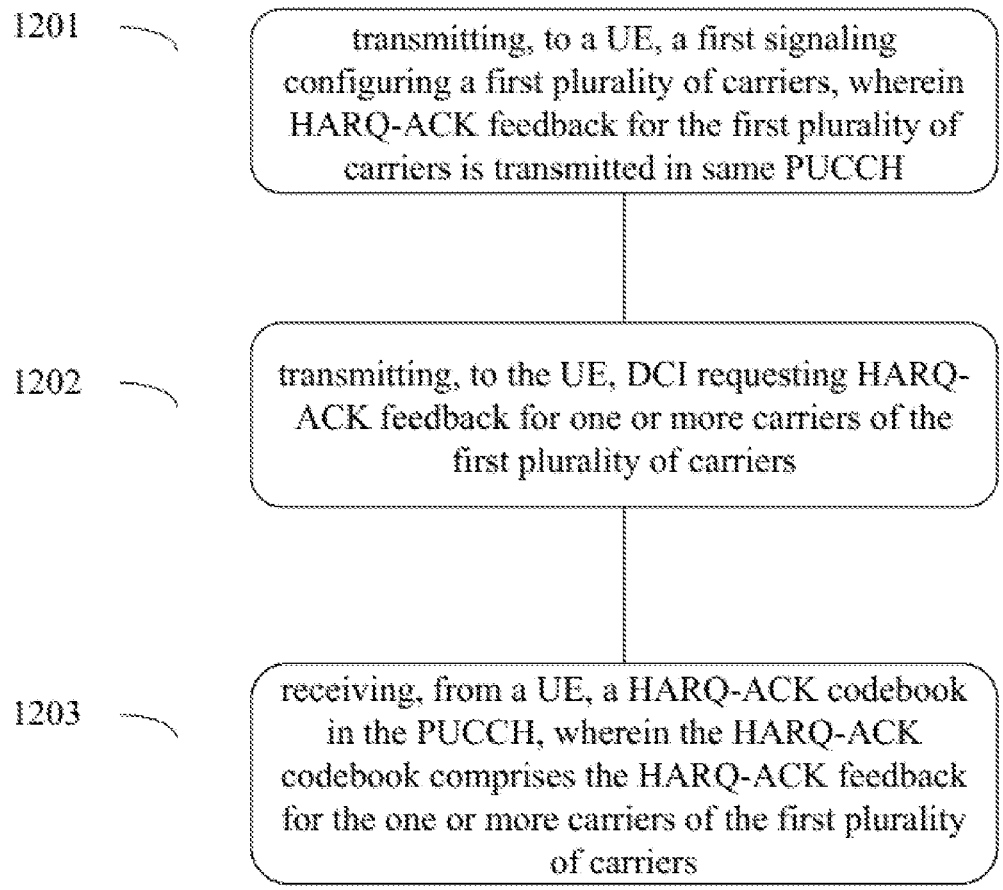
FIG. 12 illustrates a method performed by a BS for wireless communication according to some embodiments of the subject disclosure.

FIG. 12 illustrates a method performed by a BS for wireless communication according to some embodiments of the subject disclosure. In step 1201, the BS (e.g., BS 102 as shown in FIG. 1) transmits, to UE, a first signaling configuring a first plurality of carriers, wherein HARQ-ACK feedback for the first plurality of carriers is transmitted in the same PUCCH. In step 1202, the BS transmits, to the UE, DCI requesting HARQ-ACK feedback for one or more carriers of the first plurality of carriers. In step 1203, the BS receives from a UE, a HARQ-ACK codebook in the PUCCH, wherein the HARQ-ACK codebook comprises the HARQ-ACK feedback for the one or more carriers of the first plurality of carriers.

In one embodiment, the one or more carriers of the first plurality of carriers are indicated by an indicator in the DCI, for example, the carriers 3, 5, 8, 13, and 15 in FIG. 5 are indicated by a bitmap included in the DCI. The presence of the indicator could be configured by RRC signaling.

In one embodiment, the length of the indicator, for example, a bitmap, is equal to the number of the first plurality of carriers and each bit corresponds to one carrier of the first plurality of carriers. For instance, the length of the bitmap in FIG. 5 is 16, which is equal to the number of the 16 configured carriers. Each bit in the bitmap corresponds to one configured carrier. Setting the bits in the bitmap to different values, for example, "1" or "0", to indicate the UE whether the gNB requests the HARQ-ACK feedback for the corresponding carrier.

In another embodiment, the 16 configured carriers are divided into one or more carrier groups, for example, in FIG. 6, there are 4 carrier groups, the bitmap also has 4 bit, and each bit corresponds to one carrier group. Setting the bits in the bitmap to different values, for example, "1" or "0", to indicate the UE whether the gNB requests the HARQ-ACK feedback for the corresponding carrier group.

In another embodiment, the carriers in the first plurality of carriers have contiguous carrier indexes, for example, CC2 to CC5. The indicator indicates the index of the first carrier and the total number of the carriers. For example, the first carrier is CC2, and the total number of CC2, CC3, CC4, and CC5 is 4. If there are n carriers in the first plurality of carriers, the indicator comprises $$\left\lceil \log_2 \frac{n(n-1)}{2} \right\rceil \text{ bits,}$$

so as to cover all of the possible combinations of the carriers.

In another embodiment, the UE could determine whether the gNB requests feedback for a given carrier based on C-DAI and T-DAI.

In yet another embodiment, the DCI also indicates the size of the HARQ-ACK codebook, which is indicated from a set of possible values predetermined in standard or configured by RRC. For example, the size may be 4, 8, 16, 24, 32, 40, 48, 64, 80, 96, 112, 128, 160, 192, 224, 256, etc. If the UE determines the size of the HARQ-ACK codebook is smaller than the indicated size, then UE would append some "NACK" bits to ensure the size of the HARQ-ACK codebook is identical to the indicated size.

In one embodiment, the UE further receives a second signaling configuring a second plurality of DL HARQ processes for each of the first plurality of carriers. The HARQ-ACK codebook comprises the HARQ-ACK feedback for each of the second plurality of DL HARQ processes on each of the one or more carriers of the first plurality of carriers.

In another embodiment, the UE further receives a second signaling configuring a second plurality of DL HARQ processes for each of the first plurality of carriers, and the DCI would request the HARQ-ACK feedback for some DL HARQ processes of the second plurality of DL HARQ processes on the one or more carriers of the first plurality of carriers, for example, the bitmap in the DCI as shown in FIG. 9, request the HARQ-ACK feedback for some DL HARQ processes in the 16 DL HARQ processes. The UE shall transmit a HARQ-ACK codebook includes the same to the BS. The presence of the bitmap is configured by RRC signaling.

In one embodiment, the length of the bitmap is equal to a maximum number of the second plurality of DL HARQ processes for the first plurality of carriers with each bit corresponding to one DL HARQ process of the second plurality of DL HARQ processes. Each bit in the bitmap is set to a predefined state for requesting the HARQ-ACK feedback for the corresponding DL HARQ process. For example, the predefined state may be a value of "1" or "0".

In another embodiment, the second plurality of DL HARQ processes are divided into one or more DL HARQ process groups and the second indicator is a bitmap with each bit corresponding to a group of DL HARQ processes of the one or more DL HARQ process groups, and a length of the bitmap is equal to a total number of the one or more DL HARQ process groups. For example, in FIG. 10, the 16 DL HARQ processes are divided into 4 DL HARQ process groups, and each bit in the bitmap corresponds to one group. The length of the bitmap is equal to the number of the groups, 4. Each bit in the bitmap is set to a predefined state for requesting the HARQ-ACK feedback of the corresponding DL HARQ process group. In FIG. 10, the $2^{nd}$ and $4^{th}$ bits in the bitmap are set to "1", which is considered to be set to the predefined state, thus it suggests that the gNB requests the HARQ-ACK feedback of the $2^{nd}$ and $4^{th}$ DL HARQ process groups.

Alternatively, the DL HARQ processes for which the gNB requests HARQ-ACK feedback have contiguous HARQ process ID, for example, HARQ process 1 to HARQ process 4. The indicator could indicate the ID of these HARQ processes and the total number of the HARQ processes. For example, the first HARQ process is HARQ process 1, and the total number of HARQ process 1, 2, 3, and 4 is 4. If there are n HARQ processes in the second plurality of HARQ processes, the indicator comprises $$\left\lceil \log_2 \frac{n(n-1)}{2} \right\rceil \text{ bits,}$$

so as to cover all of the possible combinations of the HARQ processes.

In one embodiment, the HARQ-ACK information bits in the HARQ-ACK codebook are ordered firstly in ascending order of HARQ process ID on the carrier starting from a lowest carrier index, then sequentially in ascending order of the carrier index in the carrier domain, which is the ordering manner as shown in FIG. 3. Alternatively, the HARQ-ACK information bits in the HARQ-ACK codebook are ordered firstly in ascending order of the carrier index in the carrier domain, then sequentially in ascending order of the HARQ process ID on each carrier, which is the ordering manner as shown in FIG. 4.

Figure 13:
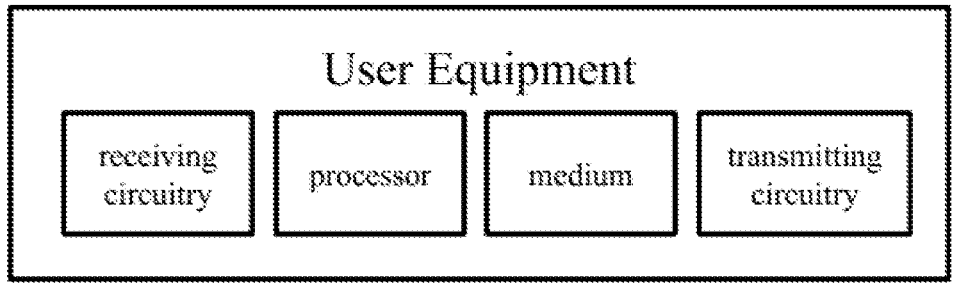
FIG. 13 illustrates a block diagram of a UE according to some embodiments of the subject disclosure.

FIG. 13 illustrates a block diagram of a UE according to the embodiments of the subject disclosure. The UE 101 may include a receiving circuitry, a processor, and a transmitting circuitry. In one embodiment, the UE 101 may include anon-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 11) with the receiving circuitry, the transmitting circuitry and the processor. That is, the receiving circuitry may receive, from a BS, a first signaling configuring a first plurality of carriers and DCI requesting HARQ-ACK feedback for one or more carriers of the first plurality of carriers, and the transmitting circuitry may transmit to the BS, a HARQ-ACK codebook in the PUCCH.

Figure 14:
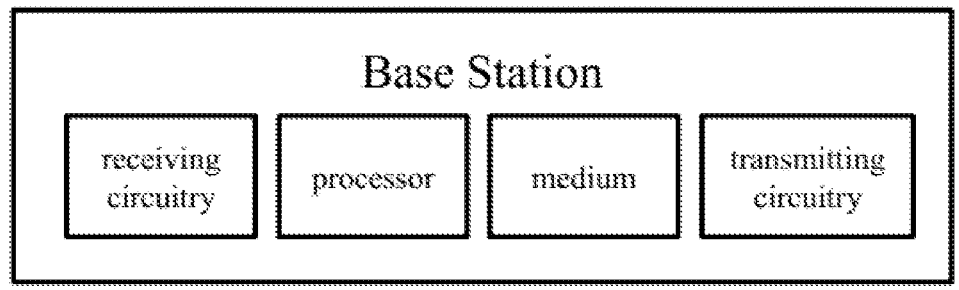
FIG. 14 illustrates a block diagram of a BS according to some embodiments of the subject disclosure.

FIG. 14 illustrates a block diagram of a BS according to the embodiments of the subject disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 12) with the receiving circuitry, the transmitting circuitry and the processor. That is, the transmitting circuitry transmits, to a UE, a first signaling configuring a first plurality of carriers and DCI requesting HARQ-ACK feedback for one or more carriers of the first plurality of carrier, and the receiving circuitry receives from a UE, a HARQ-ACK codebook in the PUCCH, wherein the HARQ-ACK codebook comprises the HARQ-ACK feedback for the one or more carriers of the first plurality of carriers.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A User Equipment (UE) for wireless communication, comprising:
   at least one memory; and
   at least one processor coupled with the at least one memory and configured to cause the UE to:
      receive, from a base station (BS), a first signaling configuring a plurality of carriers, wherein hybrid automatic repeat request-acknowledgement (HARQ-ACK) feedback for the plurality of carriers is transmitted in same physical uplink control channel (PUCCH);
      receive, from the BS, a second signaling configuring downlink (DL) HARQ processes for the plurality of carriers;
      receive, from the BS, Downlink Control Information (DCI) requesting HARQ-ACK feedback for one or more carriers of the plurality of carriers; and
      transmit, to the BS, a HARQ-ACK codebook in the PUCCH, wherein the HARQ-ACK codebook comprises the HARQ-ACK feedback for the one or more carriers of the plurality of carriers and for each of the DL HARQ processes for the plurality of carriers.

2. The UE of claim 1, wherein the one or more carriers of the plurality of carriers are indicated by a first indicator in the DCI.

3. The UE of claim 2, wherein a presence of the first indicator is configured by Radio Resource Control (RRC) signaling.

4. The UE of claim 2, wherein the first indicator is a bitmap, and wherein a length of the bitmap is equal to a total number of the plurality of carriers and each bit of the bitmap corresponds to one carrier of the plurality of carriers.

5. The UE of claim 4, wherein a bit in the bitmap is set to a predefined state for requesting the HARQ-ACK feedback for the corresponding carrier.

6. The UE of claim 2, wherein the plurality of carriers are divided into one or more carrier groups and the first indicator is a bitmap, and a length of the bitmap is equal to a total number of the one or more carrier groups with each bit corresponding to one carrier group.

7. The UE of claim 6, wherein a bit in the bitmap is set to a predefined state for requesting the HARQ-ACK feedback for the corresponding carrier group.

8. The UE of claim 2, wherein the one or more carriers of the plurality of carriers have contiguous carrier indexes and the first indicator indicates an index of the first carrier of the one or more carriers and a total number of the one or more carriers.

9. The UE of claim 8, wherein the first indicator comprises $$\left\lceil \log_2 \frac{n(n-1)}{2} \right\rceil \text{ bits,}$$

where n is a total number of the plurality of carriers.

10. The UE of claim 1, wherein the one or more carriers of the plurality of carriers is determined based on counter Downlink Assignment Index (DAI) and total DAI.

11. A Base Station (BS) for wireless communication, comprising:
    at least one memory; and
    at least one processor coupled with the at least one memory and configured to cause the BS to:
       transmit, to a User Equipment (UE), a first signaling configuring a plurality of carriers, wherein hybrid automatic repeat request-acknowledgement (HARQ-ACK) feedback for the plurality of carriers is transmitted in same physical uplink control channel (PUCCH);
       transmit, to the UE, a second signaling configuring downlink (DL) HARQ processes for the plurality of carriers;
       transmit, to the UE, Downlink Control Information (DCI) requesting HARQ-ACK feedback for one or more carriers of the plurality of carriers; and
       receive, from the UE, a HARQ-ACK codebook in the PUCCH, wherein the HARQ-ACK codebook comprises the HARQ-ACK feedback for the one or more carriers of the plurality of carriers and for each of the DL HARQ processes for the plurality of carriers.

12. The BS of claim 11, wherein the one or more carriers of the plurality of carriers are indicated by a first indicator in the DCI.

13. The BS of claim 12, wherein a presence of the first indicator is configured by Radio Resource Control (RRC) signaling.

14. The BS of claim 12, wherein the first indicator is a bitmap, and a length of the bitmap is equal to a total number of the plurality of carriers and each bit corresponds to one carrier of the plurality of carriers.

15. The BS of claim 14, wherein a bit in the bitmap is set to a predefined state for requesting the HARQ-ACK feedback for the corresponding carrier.

16. The BS of claim 12, wherein the plurality of carriers are divided into one or more carrier groups and the first indicator is a bitmap, and a length of the bitmap is equal to a total number of the one or more carrier groups with each bit corresponding to one carrier group.

17. The BS of claim 16, wherein a bit in the bitmap is set to a predefined state for requesting the HARQ-ACK feedback for the corresponding carrier group.

18. The BS of claim 12, wherein the one or more carriers of the plurality of carriers have contiguous carrier indexes and the first indicator indicates an index of the first carrier of the one or more carriers and a number of the one or more carriers.

19. A method performed by a User Equipment (UE), the method comprising:
    receiving, from a base station (BS) a first signaling configuring a plurality of carriers, wherein hybrid automatic repeat request-acknowledgement (HARQ-ACK) feedback for the plurality of carriers is transmitted in same physical uplink control channel (PUCCH);
    receiving, from the BS, a second signaling configuring downlink (DL) HARQ processes for the plurality of carriers;
    receiving, from the BS, Downlink Control Information (DCI) requesting HARQ-ACK feedback for one or more carriers of the plurality of carriers; and
    transmitting, to the BS, a HARQ-ACK codebook in the PUCCH, wherein the HARQ-ACK codebook comprises the HARQ-ACK feedback for the one or more carriers of the plurality of carriers and for each of the DL HARQ processes for the plurality of carriers.

20. A processor for wireless communication, comprising:
at least one controller coupled with at least one memory and configured to cause the processor to:
- receive, from a base station (BS), a first signaling configuring a plurality of carriers, wherein hybrid automatic repeat request-acknowledgement (HARQ-ACK) feedback for the plurality of carriers is transmitted in same physical uplink control channel (PUCCH);
- receive, from the BS, a second signaling configuring downlink (DL) HARQ processes for the plurality of carriers;
- receive, from the BS, Downlink Control Information (DCI) requesting HARQ-ACK feedback for one or more carriers of the plurality of carriers; and
- transmit, to the BS, a HARQ-ACK codebook in the PUCCH, wherein the HARQ-ACK codebook comprises the HARQ-ACK feedback for the one or more carriers of the plurality of carriers and for each of the DL HARQ processes for the plurality of carriers.

* * * * *